US006732273B1

(12) United States Patent  Byers

(10) Patent No.: US 6,732,273 B1
(45) Date of Patent: May 4, 2004

(54) PRIORITY AND SECURITY CODING SYSTEM FOR ELECTRONIC MAIL MESSAGES

(75) Inventor: Charles Calvin Byers, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/176,419

(22) Filed: Oct. 21, 1998

(51) Int. Cl.$^7$ ............................................. H04L 12/58
(52) U.S. Cl. ..................................................... 713/193
(58) Field of Search ........................ 713/193; 709/103, 709/203, 206, 207

(56) References Cited

U.S. PATENT DOCUMENTS

| | | | |
|---|---|---|---|
| 5,377,354 A | * 12/1994 | Scannell et al. ............. | 709/103 |
| 5,493,692 A | 2/1996 | Theimer et al. | |
| 5,509,000 A | 4/1996 | Oberlander | |
| 5,825,865 A | 10/1998 | Oberlander et al. | |
| 5,999,932 A | * 12/1999 | Paul ............................. | 707/10 |
| 6,167,434 A | * 12/2000 | Pang ........................... | 709/206 |

FOREIGN PATENT DOCUMENTS

| EP | 0 375 138 A2 | 6/1990 |
|---|---|---|
| EP | 0 420 779 A2 | 4/1991 |

\* cited by examiner

*Primary Examiner*—Matthew Smithers

(57) ABSTRACT

The priority and security encoding system for electronic mail messages functions to ascribe a message characterization code to the electronic mail message that enables the router as well as the destination message server to more efficiently process the electronic mail message, based upon the message characterization code. The message characterization code is assigned by the message originator, or the message server that serves the message originator, to identify the nature of the electronic mail message. The message characterization code can be defined to denote any one or more message related factors, such as: message content, identification of the message originator, identification of the message recipient, or other message processing factors. The message characterizing code is used by the message routers, network nodes, and destination message server to prioritize the processing of electronic mail messages and optionally provide subscriber defined alternate routing of certain classes of messages. This message characterizing code can also be used to automatically initiate various electronic message security measures to safeguard the most sensitive classes of messages, without the need for subscriber intervention.

24 Claims, 4 Drawing Sheets

PRIORITY AND SECURITY CODING SYSTEM FOR ELECTRONIC MAIL MESSAGES

FIELD OF THE INVENTION

This invention relates to electronic mail message systems and, in particular, to a system that assigns a message characterization code to an electronic mail message that enables the router as well as the destination message server to more efficiently process the electronic mail message, based upon the message characterization code.

PROBLEM

It is a problem in electronic mail messaging systems that all electronic mail messages are processed in a uniform manner, regardless of message content, identification of the message originator, identification of the message recipient, or other message processing factors. This results in time critical important messages being processed in the same manner as junk electronic messages. This paradigm also renders the Internet susceptible to overload in the case of a "push" based information distribution by commercial enterprises and other organizations, wherein the subscribers receive unsolicited information from various sources.

The present configuration of the Internet and the electronic communications transmitted thereon is substantially a "pull" architecture, wherein the subscribers actively request information from various sources. For example, commercial information can be obtained from the passive network presence of a company by a subscriber via the use of a browser engine that can identify appropriate servers on which the desired information resides. In addition, subscribers provide their E-Mail addresses to selected other subscribers so that electronic mail messages can be exchanged. However, it is expected that the configuration of the Internet will migrate to a substantially "push" architecture where commercial enterprises and other organizations actively distribute data to subscribers. The distribution of information is likely to be without the active solicitation by the subscriber and groups of subscribers will be targeted to receive information based upon market surveys, consumer surveys, and E-Mail lists. The information can be distributed to the subscribers via their electronic mail addresses, as is presently done in an analogous manner with paper mail.

When the push architecture is implemented, the Internet transmission and message processing capabilities are likely to be overwhelmed, since the message routers are not presently designed to handle mass mailings of information. In addition, the subscribers may receive a significantly increased number of electronic messages, over which they presently have no control. The Internet is therefore susceptible to mass mailing gridlock, which can result in the delayed delivery of important messages and the overload of subscribers with junk electronic messages.

SOLUTION

The above described problems are solved and a technical advance achieved by the present priority and security encoding system for electronic mail messages that functions to ascribe a message characterization code to each electronic mail message which enables the router as well as the destination message server to more efficiently process the electronic mail message, based upon the message characterization code. The message characterization code is assigned by the message originator, or the message server that serves the message originator, to identify the nature of the electronic mail message. The message characterization code can be defined to denote any one or more message related factors, such as: message content, identification of the message originator, identification of the message recipient, message priority and security, or other message processing factors.

The message characterizing code is used by the message routers, network nodes, and destination message server to prioritize the processing of electronic mail messages and optionally provide subscriber defined alternate routing of certain classes of messages. This message characterizing code can also be used to automatically initiate various electronic message security measures to safeguard the privacy of most sensitive classes of messages, without the need for subscriber intervention. The degree of importance of a message and the degree of privacy desired for a message are correlated, so the use of a single message characterizing code is effective to address both measures. In this manner, the present priority and security encoding system for electronic mail messages provides the subscriber, as well as the network provider, with a modicum of control over the processing of the electronic mail messages that are transmitted by message originators to the subscriber.

DETAILED DESCRIPTION

Figure 1:
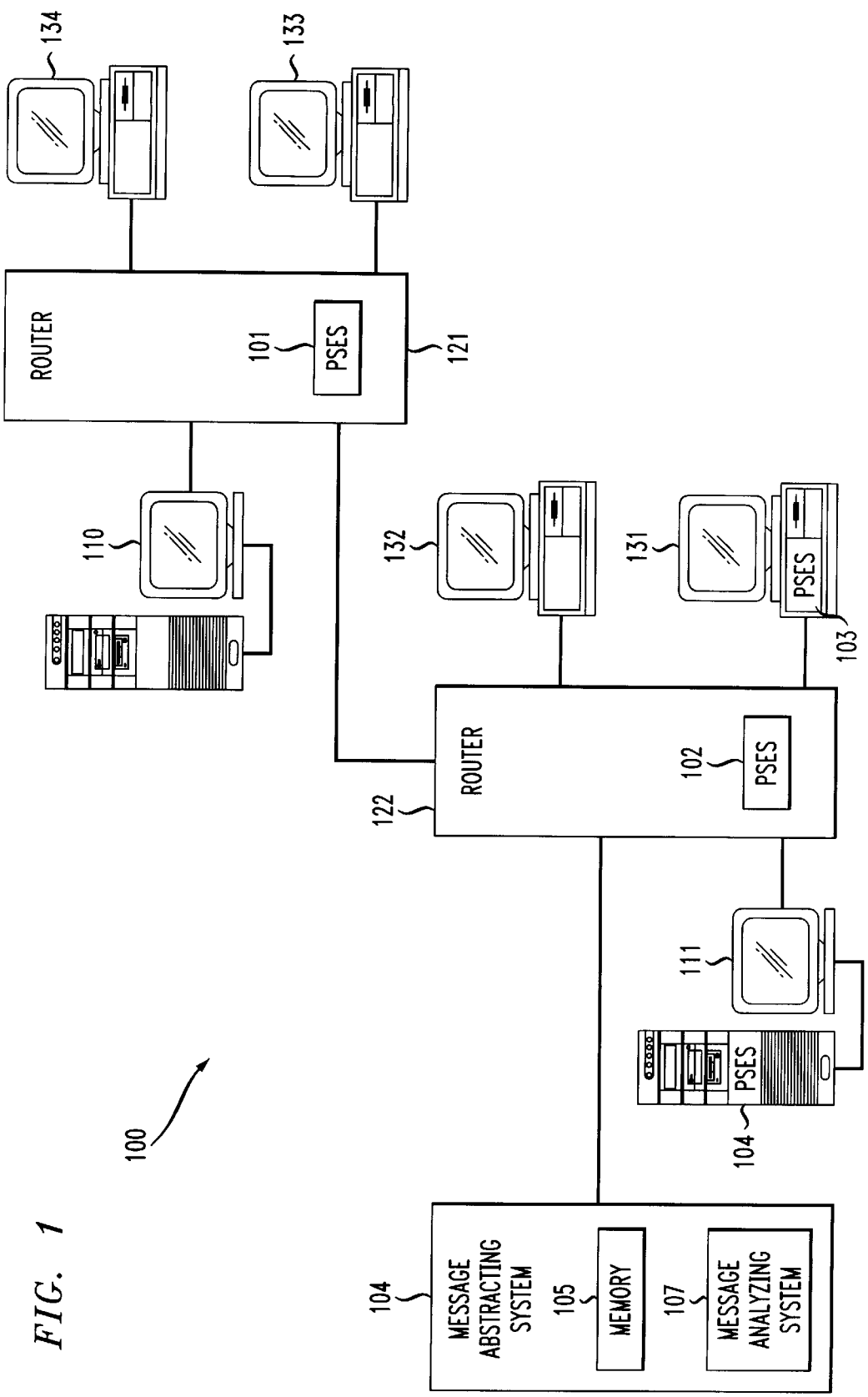
FIG. 1 illustrates in block diagram form the overall architecture of an electronic message switching system that includes the present priority and security encoding system for electronic mail messages.

FIG. 1 illustrates in block diagram form the overall architecture of an electronic message switching system 100 that includes the present priority and security encoding system for electronic mail messages 101–102 (PSES). The electronic message switching system 100 comprises a plurality of servers 110–111 and routers 121–122 that are interconnected to form an electronic network that serves to interconnect a plurality of terminal devices 131–134. The subscriber terminal devices 131–134 can be individual subscriber's personal computers 131, 134, local area network gateway processors 132, or processors 133 that are used by commercial enterprises. In the example used herein, a server 110 is used to generate and transmit electronic mail messages to selected individual subscribers at their personal computers 131, 134. The electronic mail messages can comprise any type of communication, including, but not limited to: employer-employee messages, advertising, news group mailings, social group mailings, family messages, school or community messages, audio and video clips, and the like. Each of these messages has a respective priority in terms of the timeliness required for its delivery, the importance of the message content to the recipient, the identity of the message originating party, and the identity of the message recipient.

In present electronic mail message systems, each mail message is processed without differentiation and the least important messages therefore are processed with equal attention as the most critical messages. Unfortunately, this paradigm renders the electronic message switching system 100 susceptible to overload in the case of a "push" based information distribution by commercial enterprises and other organizations. To address this problem, the present priority and security encoding system for electronic mail messages 101 functions to differentiate among the plethora of electronic mail messages that are generated for transmission to recipients via the electronic message switching system 100. The priority and security encoding system for electronic mail messages 101 can be located in any of a number of locations in the electronic message switching system 100, and for the purpose of this description is shown as being located (as elements 101–104) in each of the routers 121–122 that function as the access points for the electronic message switching system 100 as well as the subscriber's personal computer 131 and server 111. The routers 121–122 are the point at which the various subscribers enter their messages into the electronic message switching system 100 or receive their messages from the electronic message switching system 100. It is at these entry and exit points that the present priority and security encoding system for electronic mail messages 101–102 functions to assign a priority code to characterize the electronic mail message and use the assigned priority codes to process the received electronic mail messages in an electronic mail message characterized appropriate manner.

Message Generation Using the Message Characterization Code

Figure 2:
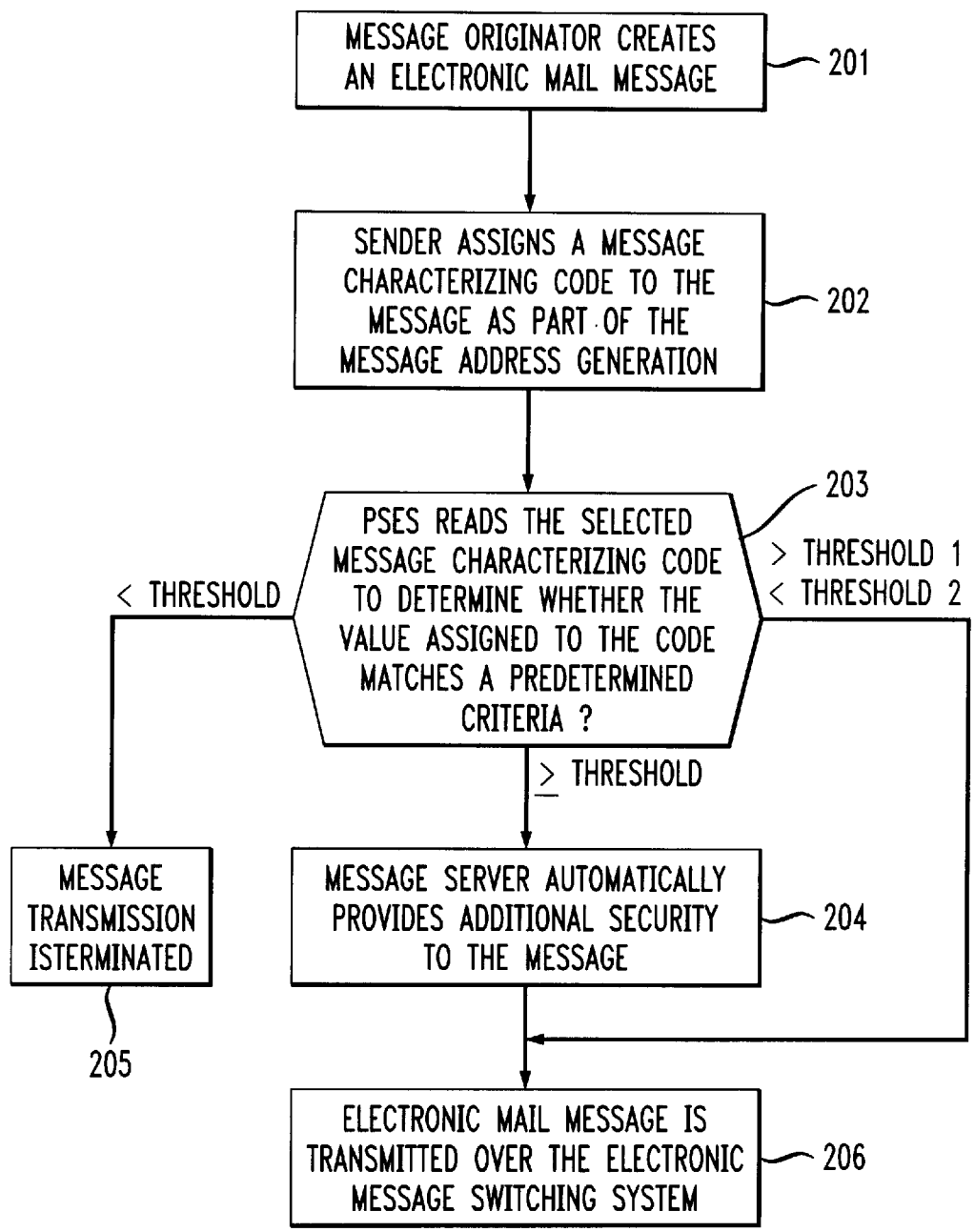
FIG. 2 illustrates in flow diagram form the operation of the present priority and security encoding system for electronic mail messages to generate a message characterization code for electronic mail messages.

FIG. 2 illustrates in flow diagram form the operation of the present priority and security encoding system for electronic mail messages 101 to generate a message characterization code for electronic mail messages. At step 201, a message originator creates a message, such as an electronic mail message, on a local server 110 that supports a text editor, mail message generation application or the like. Once the electronic mail message is completed, the sender at step 202 assigns a message characterizing code to the message as part of the message address generation. In particular, the electronic mail message comprises a plurality of segments: message body, destination address, message characterizing code. The message body comprises the text message and attachments thereto that is generated by the sender on the local server 110. The destination address comprises the E-Mail address in the typical form: xxxxxxx@yyyyyy.zzz that is used to designate a destination party. The message originating party types in this address or selects it from an address file resident on the server 110. Finally, the message originating party selects from a menu or inputs the message characterizing code that is prepended to the remainder of the electronic mail message or written into a designated portion of the address header. The message characterizing code comprises some indicia selected according to a predetermined algorithm that indicates the privacy and security of the electronic mail message. For example, the message characterizing code can be assigned according to the scale, with examples, illustrated below:

| CODE | Message Type | Sample Message |
|---|---|---|
| 00 | Test | Test message, please ignore |
| 10 | Mass Junk Mail | You may be a winner of the sweepstakes. . . |
| 20 | Target Junk Mail | Special offer for owners of Ford trucks. . . |
| 30 | Target Direct Mail | Try our bass fishing lures. . . |
| 40 | Website response | Thank you for visiting our Website, here is a 20% off coupon. . . |
| 50 | Query Response | Here is the product information that you requested |
| 60 | General Interest | There is a meeting of the school board at 7PM tonight |
| 70 | Organization wide | Staff meeting scheduled for 9 AM Friday in the conference room |
| 80 | Business Private | Due date for Product introduction is June 18. |
| 90 | Family Private | Family barbecue on July 4th. . . |
| 100 | Personal Private | Your test results from the cholesterol screening are. . . |

Once the message characterizing code is selected and assigned to the message, the priority and security encoding system for electronic mail messages 101 located in processor/local message router 121 reads the selected message characterizing code at step 203 to determine whether the value assigned to the codes matches a predetermined criteria, such as being above a certain subscriber defined threshold. If a match is not determined, processing advances to step 205 where the message processing is terminated. If a match is determined, then the prrocessor/local message server at step 204 automatically provides additional security to the message. This additional security can be, for example, encryption of the message body to thereby prevent its contents from being reviewed. Once the encryption is completed, processing advances to step 206, where the entirety of the electronic mail message is transmitted over the electronic message switching system 100 using the well known physical transport facilities of the electronic message switching system 100. This additional security can also include shredding the disk sectors in the memory of the system where the message is stored, once the message is transmitted, to thereby leave no readable copy of the message in memory. A further option at step 203 is that the selected message characterizing code lies between two thresholds, where the message is deemed to be a routing message and warrants no special treatment. In this instance, processing advances to step 206, where the entirety of the electronic mail message is transmitted over the electronic message switching system 100 using the well known physical transport facilities of the electronic message switching system 100.

Router Processing of Electronic Messages Using the Message Characterizing Code The electronic message switching system 100 itself can use the message characterizing code to expedite the processing of the electronic mail messages that are transmitted over the electronic message switching system 100. In particular, the electronic message switching system 100 processes a large number of electronic mail messages and, when faced with a traffic overload, must initiate traffic overload mitigation procedures. There are numerous such procedures presently in use in electronic message switching systems but none make use of the message content or message characterizing data to process the electronic mail messages in different manners. The presently assigned message characterizing code can be used by the electronic message switching system 100 to process the electronic mail messages in order of priority as defined by the message characterizing code assigned by the message originator and/or by the priority and security encoding system for electronic mail messages 101. Thus, electronic mail messages that have a high value message characterizing code are processed before those with a lower value message characterizing code. The processing of the electronic mail messages can be defined with further granularity at the subscriber's serving router, which is also termed an E-mail server, as described below.

Received Message Processing Using the Message Characterization Code

Figure 3:
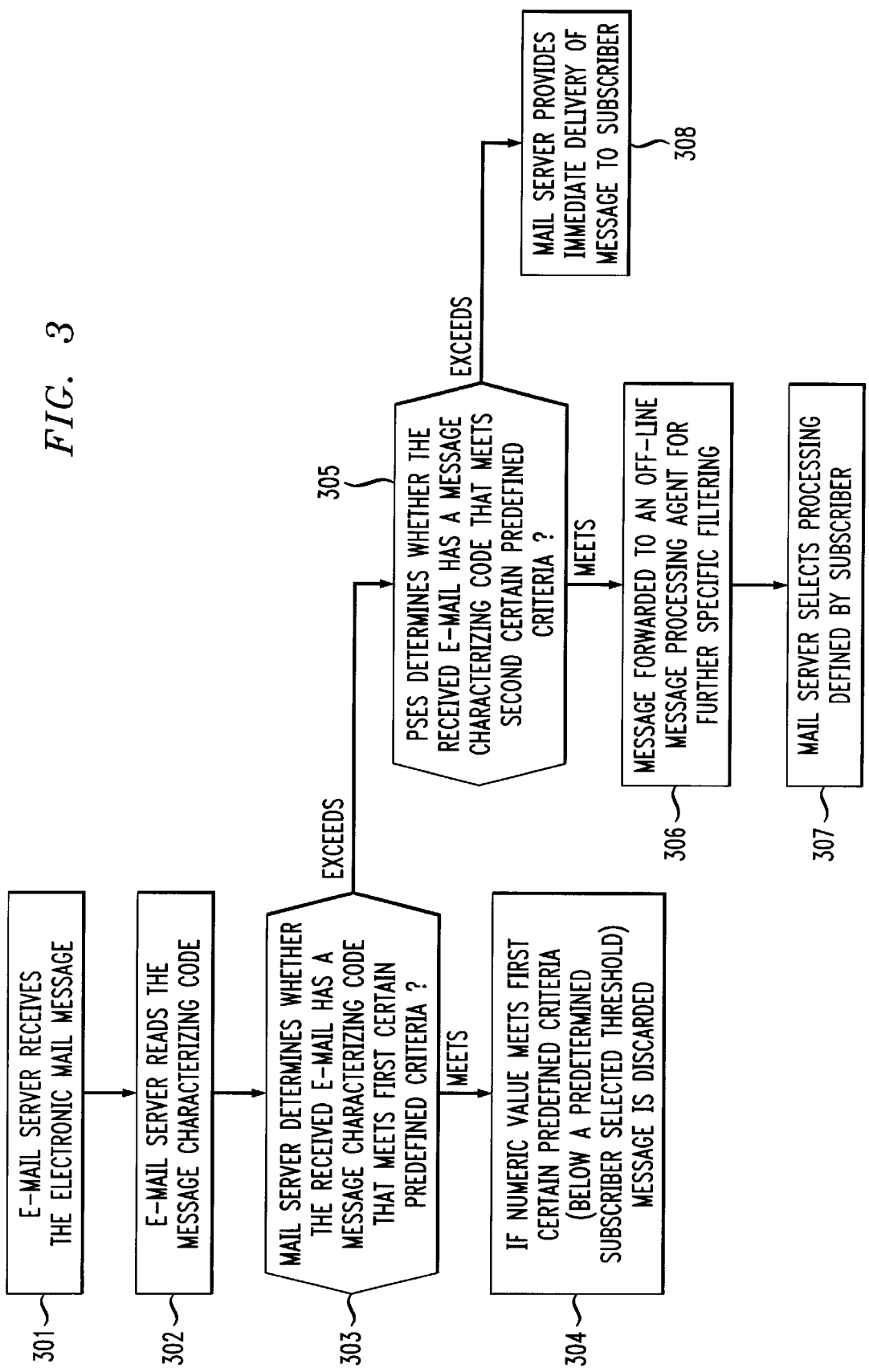
FIG. 3 illustrates in flow diagram form the operation of the present priority and security encoding system for electronic mail messages to use the message characterization code for electronic mail messages in the processing of electronic mail messages.

FIG. 3 illustrates in flow diagram form the operation of the present priority and security encoding system for electronic mail messages to use the message characterization code for electronic mail messages in the processing of electronic mail messages. At step 301 the recipient's inbound E-Mail server 122 receives the electronic mail message originated by the sender 110. At step 302, the E-Mail server 122 reads the message characterizing code that is included in the message header. A plurality of message processing steps then ensues, with the implementation of these process steps being the subject of the recipients electronic mail message processing algorithm, wherein the code range is programmable by the recipient. An example of the message characterizing code categories and the user defined message processing algorithms are as follows:

| CODE Range | Message Access Properties and/or Processing |
| --- | --- |
| P < 95 | Spouse Read Permission |
| P < 90 | Children Read permission |
| P < 80 | Secretary read permission |
| P < 70 | Colleagues read permission |
| P < 70 | Encryption enabled |
| P > 80 | Auto forward |
| P > 90 | Auto pager alert |
| P > 40 | Store and abstract for later retrieval |
| P < 80 | Disk shred after delete |
| 40 > P > 10 | Filter by Media agent |
| P < 10 | Delete on reception |

The examples illustrated herein represents a simple and likely method of processing incoming E-Mail messages. In particular, at step 303, the mail server 122 determines whether the received E-Mail has a message characterizing code that meets certain predefined criteria, such as having a numeric value below a predetermined subscriber selected threshold (P<10). If so the message is discarded without delivery to the recipient. If the message passes the first filter by exceeding the threshold, then at step 305 the second filter comprises a process that determines whether the received E-Mail has a message characterizing code that meets certain predefined criteria, such as having a numeric value between two predetermined subscriber selected thresholds (40>P>10). If so the message is forwarded at step 306 to an off-line message processing agent for further specific filtering, as is described below. Typically, the message is copied to a backup media for abstracting and later retrieval by the recipient. If the message passes the first two filters, then at step 307 the mail server 122, having determined that the received E-Mail has a message characterizing code has a numeric value above a predetermined subscriber selected threshold (P>40), then the message causes the generation of an alert to the subscriber if the message characterizing code is above some predefined additional threshold. Thus, if the message characterizing code is P>80, the message is automatically forwarded to the subscriber, for example if the subscriber is not at their subscriber terminal device 131. Furthermore, if the message characterizing code is P>90, the message is not only automatically forwarded to the subscriber, but a pager alert is generated to make the subscriber aware of the receipt of a message of significant importance.

The message characterizing code can also be used by the subscriber to establish access permissions. As noted above, the messages of a lesser priority can be accessed by a wider audience, while the more important messages have a greater need for privacy and the associated smaller permitted audience of potential recipients. The access permissions are typically managed by the message retrieval process requiring the retrieving individual to provide a subscriber identification code, such as a password, to thereby ensure that unauthorized access of the received messages is thwarted.

Message Abstracting

Figure 4:
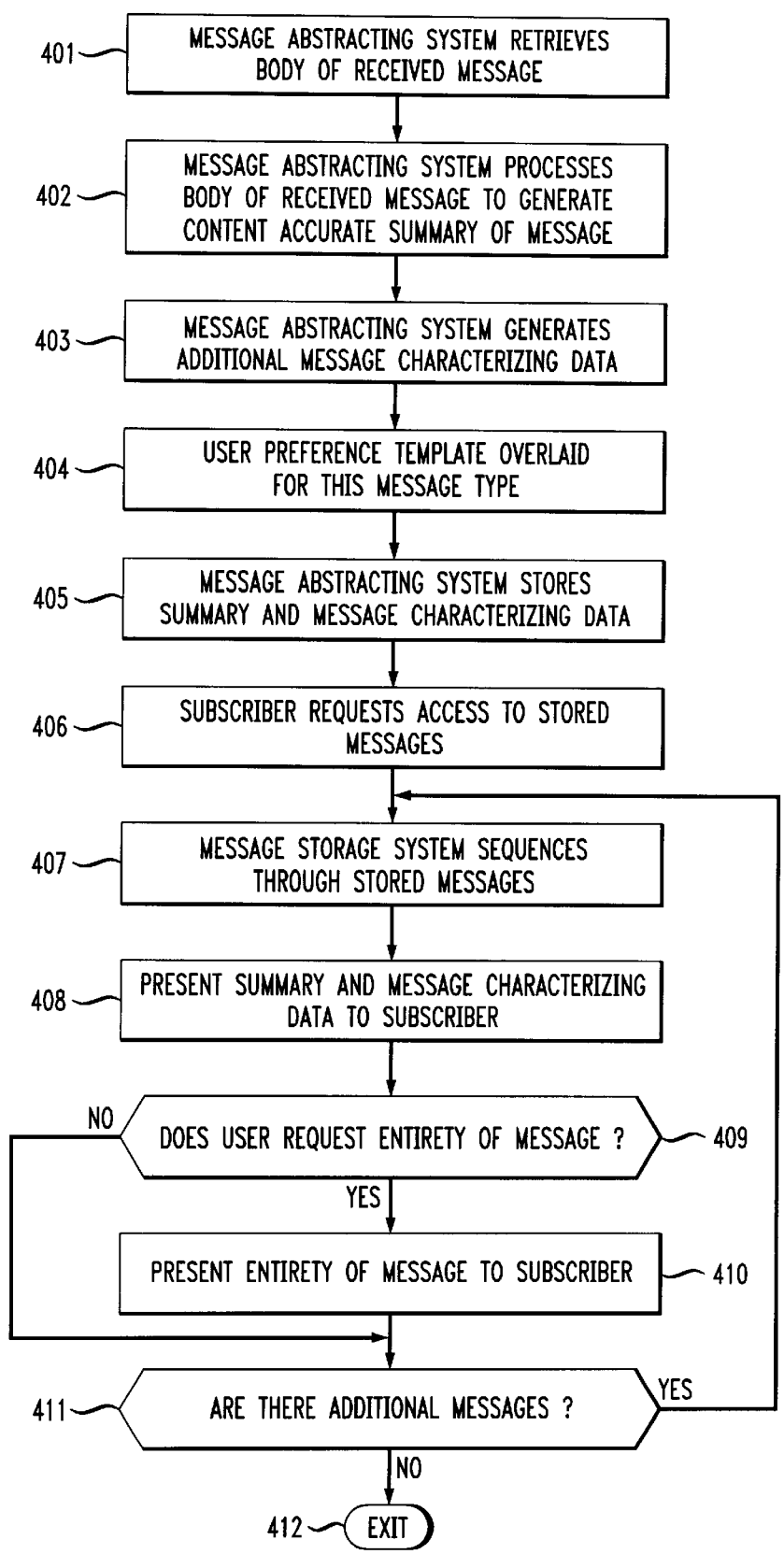
FIG. 4 illustrates in flow diagram form the operation of the message abstracting feature of the present priority and security encoding system for electronic mail messages.

FIG. 4 illustrates in flow diagram form the operation of the message abstracting feature of the present priority and security encoding system for electronic mail messages. Once a message is stored in memory of the router 122 for the recipient at subscriber terminal device 131, the message abstracting apparatus 104 is activated to access the received message to produce data that accurately characterizes the nature and content of the received message. The message abstracting apparatus 104 at step 401 retrieves the body of the received message and generates a content accurate summary of the received message at step 402. The content accurate summary comprises data that provides the subscriber with an indication of the content of the received message, obtained by analyzing and processing the entirety of the body of the message.

The message abstracting function can be accomplished in any of a number of ways, depending on the degree of relevance of the summary desired by the subscriber and the amount of processing capability that must be extended to produce the summary. Assume for the purpose of this discussion that the message abstracting apparatus 104 includes a message analyzing system 107 that comprises a key word abstract system that operates on a text file to extract a plurality of key words or key word strings that are indicative of frequent usage in the text message and, therefore, most likely the content of the text message. The body of the text message is input into a temporary memory 106 which is used by the message abstracting system 104 to store input files while the message analyzing system 107 performs the information content analysis function. Once the text message is stored in the temporary memory 106, the message analyzing system 107 in well-known fashion retrieves sequentially each word in the text message and performs a word count function wherein a table created indicating the frequency of occurrence of the words contained in the text string, excluding standard prepositions and common words that contain little informational content. As a result of this abstracting function, a table has now been produced that indicates the most frequently used words or word strings in the text message. Additional data can also be generated by the message analyzing system 107 at step 403 to indicate the length of the message, its source and frequency of usage of the various key words that have been extracted. At step 404, the message analyzing system 107 can overlay a user preference template, indicative of the particular processing desired for this type of message. This summary content information is then stored in memory 105 at step 405 along with the appropriate addressing information indicative of the association of this summary with the stored text message.

Subscriber Access of Stored Messages

When the subscriber accesses the router 122 at step 406 to retrieve messages stored therein, the router 122 sequences through the stored messages that are addressed to the subscriber. The router 122 at step 407 retrieves the message summary and message characterizing data from the message abstracting system 104 that has been previously generated and is associated with this retrieved message. The router 122 initially provides the subscriber with the summary that is stored in conjunction with the text message at step 408. This enables the subscriber to obtain an indication of the content of the text messages and its duration to enable the subscriber to determine whether retrieval of the entirety of the text message is warranted. If the subscriber does not wish to review the entirety of the message, processing advances to step 411. If the subscriber wishes to receive the entirety of the retrieved message, this determination is made at step 409 and the message abstracting system 104 presents the entirety of the retrieved message to the subscriber at step 410. Once the retrieved message has been presented to the subscriber at step 410, the message abstracting system 104 at step 411 determines whether additional unretrieved messages remain in the multi-media message storage system 100. If so, processing returns to step 407, otherwise processing exits this routine at step 412.

Auditing of the Message Characterizing Codes

It is to be expected that some subscribers will attempt to abuse the use of the message characterizing codes to thereby obtain a higher level of electronic mail message processing than is appropriate for their messages. In order to thwart such abuse, the present priority and security encoding system for electronic mail messages can include an audit function that monitors the use on the message characterizing codes and automatically takes remedial action if the message characterizing codes are inappropriately used. For example, the subscribers to the electronic message switching system can be assigned various message characterizing code classifications, so that the business messages that are generated by the subscriber are assigned a particular message characterizing code or range of codes, while the advertising messages that are generated and transmitted by the subscriber are assigned another, lower message characterizing code. This preassignment of permitted codes or code levels reduces the probability that the subscriber can misassign a message characterizing code. The fidelity of the code usage by the subscriber can be monitored by means of spot checks using an expert system to ascertain message content and its appropriateness with respect to the assigned message characterizing code, or the determination of the relative volume of messages output in each of the assigned code categories, especially with respect to the past pattern of message activity. Furthermore, the fan-out of the messages can be monitored to detect instance of a message originator transmitting messages to a large number of recipients, which is indicative of mass mailing of junk E-Mail.

Violation of the message characterizing code assignment would subject the subscriber to punitive action, such as fines or even termination of their service access to the electronic message communication system by the servine Internet Service Provider. There can also be legislatively mandated penalties wherein the message originator can be subject to legal action by government agencies or penalties can be imposed by these agencies.

SUMMARY

The priority and security encoding system for electronic mail messages functions to ascribe a message characterization code to each electronic mail message which enables the router as well as the destination message server to more efficiently process the electronic mail message, based upon the message characterization code. The message characterization code is automatically assigned by the message originator, or the message server that serves the message originator, to identify the nature of the electronic mail message. The message characterization code can be defined to denote any one or more message related factors, such as: message content, identification of the message originator, identification of the message recipient, or other message processing factors.

What is claimed:

1. A system for processing a received electronic mail message according to a predetermined priority scheme, comprising:

means for reading a message characterizing code that is associated with said received electronic mail message;

means for storing data indicative of a plurality of electronic mail message processing protocols, comprising:

means for defining a plurality of message characterizing code categories, each of which comprises at least one message characterizing code that comprises a user provided one of a threshold value and a range of threshold values;

means, responsive to said message characterizing code, for selecting a one of said plurality of electronic mail message processing protocols that most closely corresponds to said message characterizing code; and means for processing said received electronic mail message according to said selected electronic mail message processing protocol.

2. The system for processing a received electronic mail message of claim 1 wherein said means for reading comprises:

means for separating a header from said received electronic mail message; and means for excerpting said message characterizing code from said header.

3. The system for processing a received electronic mail message of claim 1 wherein said means for storing data comprises:

means for defining an associated at least one of a message processing algorithm and a message access algorithm that define the processing of the received electronic mail message.

4. The system for processing a received electronic mail message of claim 3, wherein said means for defining an associated at least one of a message processing algorithm and a message access algorithm comprises:

means for identifying individuals who are authorized to retrieve a received electronic mail message.

5. The system for processing a received electronic mail message of claim 3, wherein said means for defining an associated at least one of a message processing algorithm and a message access algorithm comprises:

means for identifying a method of routing a received electronic mail message to a one of a plurality of destinations.

6. The system for processing a received electronic mail message of claim 3, wherein said means for defining an associated at least one of a message processing algorithm and a message access algorithm comprises:

means for encrypting a received electronic mail message prior to transmission to a one of a plurality of destinations.

7. The system for processing a received electronic mail message of claim 3, wherein said means for defining an associated at least one of a message processing algorithm and a message access algorithm comprises:

means for shredding disk sectors that stored a received electronic mail message once said received electronic mail message is transmitted to a one of a plurality of destinations.

8. A system for processing a received electronic mail message according to a predetermined priority scheme, comprising:

means for reading a message characterizing code that is associated with said received electronic mail message;

means for storing data indicative of a plurality of electronic mail message processing protocols;

means, responsive to said message characterizing code, for selecting a one of said plurality of electronic mail message processing protocols that most closely corresponds to said message characterizing code;

means for processing said received electronic mail message according to said selected electronic mail message processing protocol;

means for abstracting said received electronic mail message, comprising;

a memory for storing said received electronic mail message;

means, responsive to said received electronic mail message, for extracting information from a body of said received electronic mail message that is indicative of a content of said received electronic mail message; and means for storing said extracted data in a manner to enable presentation of said stored extracted to a recipient of said received electronic mail message.

9. A method for processing a received electronic mail message according to a predetermined priority scheme, comprising the steps of:

reading a message characterizing code that is associated with said received electronic mail message;

storing data in a memory indicative of a plurality of electronic mail message processing protocols, comprising:

defining a plurality of message characterizing code categories, each of which comprises at least one message characterizing code that comprises a user provided one of a threshold value and a range of threshold values;

selecting, in response to said message characterizing code, a one of said plurality of electronic mail message processing protocols that most closely corresponds to said message characterizing code; and processing said received electronic mail message according to said selected electronic mail message processing protocol.

10. The method for processing a received electronic mail message of claim 9 wherein said step of reading comprises:

separating a header from said received electronic mail message; and excerpting said message characterizing code from said header.

11. The method for processing a received electronic mail message of claim 9 wherein said step of storing data comprises:

defining an associated at least one of a message processing algorithm and a message access algorithm that define the processing of the received electronic mail message.

12. The method for processing a received electronic mail message of claim 11, wherein said step of defining an associated at least one of a message processing algorithm and a message access algorithm comprises:

identifying individuals who are authorized to retrieve a received electronic mail message.

13. The method for processing a received electronic mail message of claim 11, wherein said step of defining an associated at least one of a message processing algorithm and a message access algorithm comprises:

identifying a method of routing a received electronic mail message to a one of a plurality of destinations.

14. The method for processing a received electronic mail message of claim 11, wherein said step of defining an associated at least one of a message processing algorithm and a message access algorithm comprises:

encrypting a received electronic mail message prior to transmission to a one of a plurality of destinations.

15. The method for processing a received electronic mail message of claim 11, wherein said step of defining an associated at least one of a message processing algorithm and a message access algorithm comprises:

shredding disk sectors that stored a received electronic mail message once said received electronic mail message is transmitted to a one of a plurality of destinations.

16. A method for processing a received electronic mail message according to a predetermined priority scheme, comprising the steps of:

reading a message characterizing code that is associated with said received electronic mail message;

storing data in a memory indicative of a plurality of electronic mail message processing protocols;

selecting, in response to said message characterizing code, a one of said plurality of electronic mail message processing protocols that most closely corresponds to said message characterizing code; and processing said received electronic mail message according to said selected electronic mail message processing protocol;

abstracting said received electronic mail message, comprising:

storing in a memory said received electronic mail message;

extracting, in response to said received electronic mail message, information from a body of said received electronic mail message that is indicative of a content of said received electronic mail message; and storing said extracted data in a manner to enable presentation of said stored extracted to a recipient of said received electronic mail message.

17. A system for processing an electronic mail message through a communication network to a designated message recipient according to a predetermined priority scheme, comprising:

means for reading a message characterizing code that is associated with said electronic mail message;

means for routing said electronic mail message through said communication network in order of priority defined by said message characterizing code;

means for storing data provided by said message recipient indicative of a plurality of electronic mail message processing protocols, comprising:

means for defining a plurality of message characterizing code categories, each of which comprises at least one message characterizing code that comprises a user provided one of a threshold value and a range of threshold values;

means, responsive to said message characterizing code, for selecting a one of said plurality of electronic mail message processing protocols that most closely corresponds to said message characterizing code; and means for processing said electronic mail message according to said selected electronic mail message processing protocol.

18. The system for processing an electronic mail message of claim 17 wherein said means for storing data comprises:

means for defining an associated at least one of a message processing algorithm and a message access algorithm that define the processing of an electronic mail message.

19. The system for processing an electronic mail message of claim 18, wherein said means for defining an associated at least one of a message processing algorithm and a message access algorithm comprises:

means for identifying individuals who are authorized to retrieve an electronic mail message.

20. The system for processing an electronic mail message of claim 18, wherein said means for defining an associated at least one of a message processing algorithm and a message access algorithm comprises:

means for identifying a method of routing an electronic mail message to a one of a plurality of destinations.

21. A method for processing an electronic mail message through a communication network to a designated message recipient according to a predetermined priority scheme, comprising the steps of:

reading a message characterizing code that is associated with said electronic mail message;

routing said electronic mail message through said communication network in order of priority defined by said message characterizing code;

storing data provided by said message recipient indicative of a plurality of electronic mail message processing protocols;

selecting, in response to said message characterizing code, a one of said plurality of electronic mail message processing protocols that most closely corresponds to said message characterizing code; and processing said electronic mail message according to said selected electronic mail message processing protocol.

22. The method for processing an electronic mail message of claim 21 wherein said step of storing data comprises:

defining an associated at least one of a message processing algorithm and a message access algorithm that define the processing of an electronic mail message.

23. The method for processing an electronic mail message of claim 22, wherein said step of defining an associated at least one of a message processing algorithm and a message access algorithm comprises:

identifying individuals who are authorized to retrieve an electronic mail message.

24. The method for processing an electronic mail message of claim 22, wherein said step of defining an associated at least one of a message processing algorithm and a message access algorithm comprises:

identifying a method of routing an electronic mail message to a one of a plurality of destinations.

* * * * *